(12) United States Patent
Riddick et al.

(10) Patent No.: US 12,241,903 B2
(45) Date of Patent: Mar. 4, 2025

(54) SYSTEM, METHOD, AND APPARATUS FOR AUTOMATING SPECIMEN TESTING

(71) Applicant: Illinois Tool Works Inc., Glenview, IL (US)

(72) Inventors: Adrian Riddick, Norwood, MA (US); Daniel Chouinard, Norwood, MA (US); Brian Salem, Norwood, MA (US); Christopher Hines, Norwood, MA (US)

(73) Assignee: Illinois Tool Works Inc., Glenview, IL (US)

( * ) Notice: Subject to any disclaimer, the term of this patent is extended or adjusted under 35 U.S.C. 154(b) by 351 days.

(21) Appl. No.: 17/578,821

(22) Filed: Jan. 19, 2022

(65) Prior Publication Data

US 2022/0229079 A1 Jul. 21, 2022

Related U.S. Application Data

(60) Provisional application No. 63/140,069, filed on Jan. 21, 2021.

(51) Int. Cl.
*G01N 35/00* (2006.01)

(52) U.S. Cl.
CPC . *G01N 35/00029* (2013.01); *G01N 35/00613* (2013.01); *G01N 2035/00277* (2013.01)

(58) Field of Classification Search
CPC ....... G01N 35/00029; G01N 35/00613; G01N 2035/00277; G01N 2035/0441;
(Continued)

(56) References Cited

U.S. PATENT DOCUMENTS 4,306,448 A * 12/1981 Rohde ............... G01B 5/06
73/52
4,315,427 A *  2/1982 Leiter ............... G01M 3/36
73/49.3
(Continued)

FOREIGN PATENT DOCUMENTS

EP       3647764 A1     5/2020
WO  WO-2018063890 A1 *  4/2018  ............ G01N 19/04

OTHER PUBLICATIONS

PCT, International Search Report and Written Opinion regarding PCT Application No. PCT/US2022/013274, dated Apr. 14, 2022, 19 pages.
(Continued)

*Primary Examiner* — Robert R Raevis
(74) *Attorney, Agent, or Firm* — McAndrews, Held & Malloy, Ltd.

(57) ABSTRACT

Described is a testing system for performing specimen testing, such as residual seal force (RSF) testing and/or compression friction (CF) measurement testing. The testing system comprising a column supported by a base structure, a load cell supported by said column, a specimen plate configured to receive a plurality of specimens, a motor, and controller. The load cell is configured to move along the column toward and away from the base structure via a crosshead coupled to an actuator. The plurality of specimens comprising a first specimen and a second specimen. The controller is configured to control the motor to adjust a position of said specimen plate.

20 Claims, 7 Drawing Sheets

(58) Field of Classification Search
CPC ... G01N 2035/0484; G01N 2203/0019; G01N 2203/0067; G01N 2203/0085; G01N 2203/0092; G01N 2203/047; G01N 2203/0676; G01N 35/04; G01N 3/08; G01N 3/12; G01N 2203/0037; G01N 19/04; G01N 21/9054; G01N 2033/009
USPC ......... 73/863.01, 1.01, 9, 52, 785, 788, 821, 73/822, 865.8, 865.9, 432.1; 209/530, 209/531, 532
See application file for complete search history.

(56) References Cited

U.S. PATENT DOCUMENTS

| | | | | |
|---|---|---|---|---|
| 4,706,494 | A | * | 11/1987 | Creed .................... G01M 3/36 73/49.3 |
| 5,591,899 | A | * | 1/1997 | Griesbeck ............ B07C 5/3404 356/240.1 |
| 2006/0156826 | A1 | | 7/2006 | Apelqvist et al. |
| 2014/0260557 | A1 | * | 9/2014 | Chevalier, Jr. .......... G01M 3/36 73/52 |
| 2018/0209882 | A1 | | 7/2018 | Switek, Jr. |

OTHER PUBLICATIONS

Anonymous, "Non-destructive on seal integrity—Nicht zerstörende Dichtigkeitsprüfung an Ampullen," Mar. 12, 2012 (Mar. 12, 2012), XP055912844, Retrieved from the Internet: https://youtube/watch?v=9g_flLtW7zl [retrived on Apr. 14, 2022} whole document; one page.

PCT, International Preliminary Report on Patentability regarding Application No. PCT/US2022/013274, dated Jul. 20, 2023, 13 pages.

* cited by examiner

SYSTEM, METHOD, AND APPARATUS FOR AUTOMATING SPECIMEN TESTING

CROSS REFERENCE TO RELATED APPLICATIONS

The present application claims the benefit of, and priority to, U.S. Provisional Patent Application No. 63/140,069, entitled "System, Method, And Apparatus For Automating Specimen Testing," filed Jan. 21, 2021, the entire contents of which are hereby incorporated by reference.

FIELD

The present disclosure is directed to specimen testing and, more particularly, to a system, method, and apparatus for automating residual seal force testing and/or compression friction measurement testing.

BACKGROUND

Since the early part of the 20$^{th}$ century, containers (e.g., cartridges, bottles, vials, etc.) with elastomeric closures and, in some cases, crimped caps have been a primary packaging system for parenteral (i.e., injectable) medicines. Parenteral products contained in such container package systems require a robust seal at the interface between the glass container and the elastomeric stopper to prevent contamination and product leakage. While the seal is established in the manufacturing process, it must withstand a variety of handling, processing, and storage conditions prior to use.

In some examples, container seal is composed of three major components—the glass container, an elastomeric closure (e.g., a rubber stopper), and a cap that secures the rubber stopper in the container, such as an aluminum cap. When a metal cap is used, typically an aluminum or aluminum alloy, the cap must be crimped onto the stopped container with a compressive force that will ensure sufficient mating of the container and elastomeric closure. In other examples, the cap is removed for other testing. Closure variables that affect the container seals include dimensional characteristics and tolerances, along with the mechanical properties of the closure components, including modulus, hardness, and compression set.

Manufacturers of parenteral containers are required to employ a quantitative method for measuring the force a closure exerts against the container after the initial seal is made and throughout the shelf life of the product. In the case of a closure that uses a metal cap, this force measured using a residual seal force ("RSF") test, while a compression friction ("CF") measurement test is used evaluate a glass container that is sealed using a plunger. A CF measurement test is sometimes called a glide test. While existing RSF and CF testers can measure the RSF and CF, such testing can be time consuming, tedious, and labor intensive. Therefore, it is desirable to provide a more accurate, more tolerant, and/or automated system, method, and apparatus for RSF and/or CF testing.

SUMMARY

Systems, methods, and apparatuses for testing are disclosed, substantially as illustrated by and described in connection with at least one of the figures. More particularly, systems, methods, and apparatuses are disclosed for determining the residual seal force and/or compression friction measurement for containers, particularly containers for parenteral pharmaceutical products.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 2e illustrates a top plan cross-sectional view of the example rotating platen assembly taken along section C-C of FIG. 2a.

DETAILED DESCRIPTION

Figure 1A:
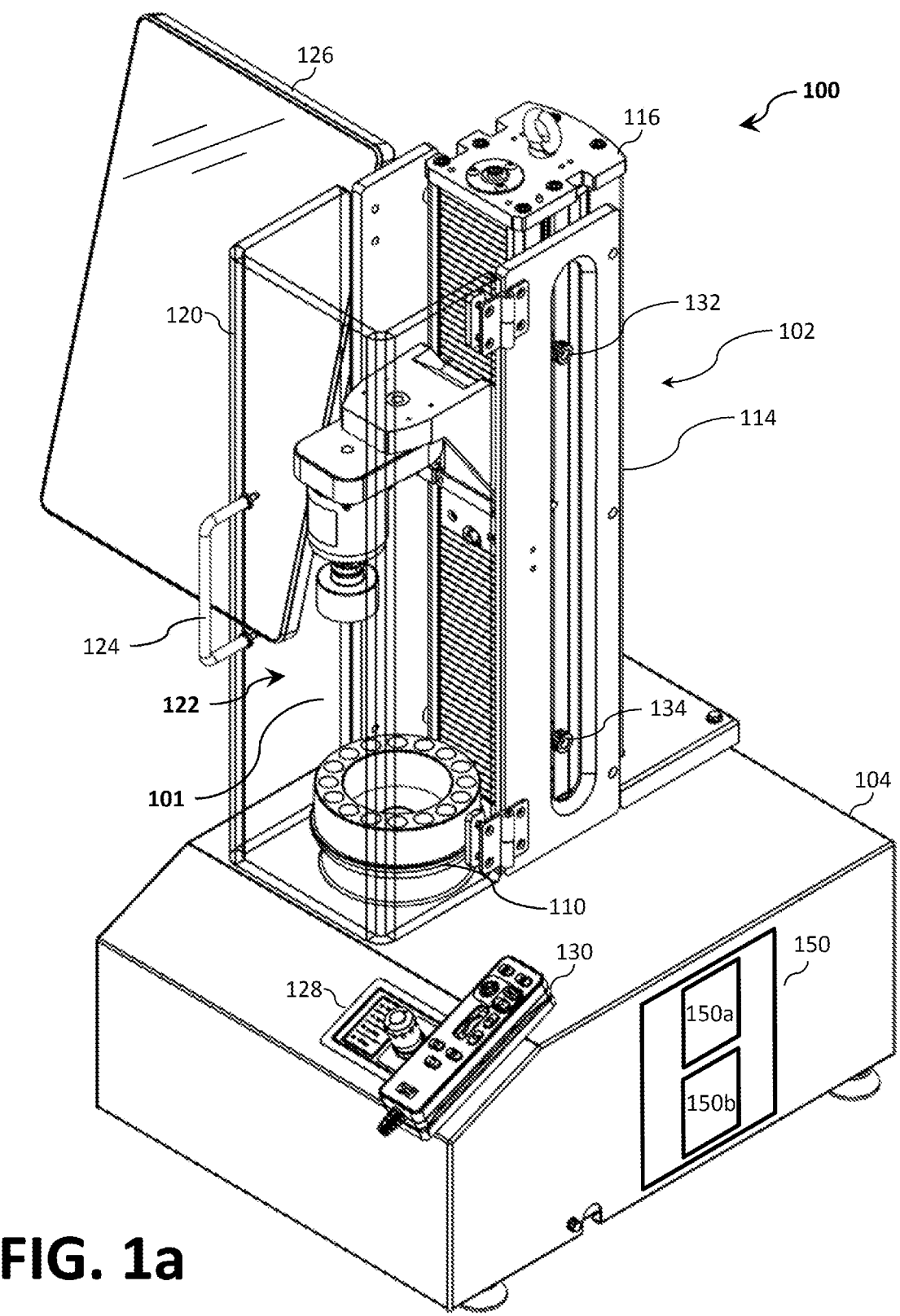
FIG. 1a illustrates a perspective view of an example testing system in accordance with aspects of this disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "circuit" and "circuitry" includes any analog and/or digital components, power and/or control elements, such as a microprocessor, digital signal processor (DSP), software, and the like, discrete and/or integrated components, or portions and/or combinations thereof.

As used herein, the terms "compression rod" and "compression pin" as used herein, each mean a rigid structure configured to impart a compressive force upon a specimen positioned in a testing system. In the case of a CF test, for example, the compression pin can be used to compress the elastomeric closure within a rigidly-supported parenteral container, such as a vial.

As used herein, the terms "drivingly coupled," "drivingly coupled to," and "drivingly coupled with" as used herein, each mean a mechanical connection that enables a driving part, device, apparatus, or component to transfer a mechanical force to a driven part, device, apparatus, or component.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

As used herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

A quantitative method for measuring a closure force exerted against a container after sealing can be performed using a constant rate of compression testing machine. By exerting a slow, constant rate of compression on a sealed container, a stress vs. time curve can be generated to determine a residual seal force (RSF) measurement of a given closure seal in a specimen. The RSF measurement can be determined for a variety of containers with various closure sizes and shapes. RSF measurements, for example, can be used to indicate the security of the container's closure as part of a manufacturer's quality control. The initial force with which the closure compresses the container is a function of the vertical and horizontal crimping forces applied during application (e.g., crimping) of the aluminum cap; however, due to the viscoelastic relaxation behavior of rubber, the force of the closure pressing against the containers decays as a function of time, elastomer composition, and as a result of various processing procedures. In another example, a compression friction (CF) measurement test can be performed using the compression testing machine to qualify a glass container that is sealed using an elastomeric closure (e.g., a plunger). A CF measurement test is sometimes referred to as a glide test.

To evaluate a seal tightness, manufacturers sometimes use manual testing systems as part of their quality control processes to measure the RSF or the CF of a parenteral package created during a container-sealing process. Typically, manufacturers test small batches or volumes (e.g., lot or line samples) as part of its quality control efforts. Because RSF and CF testing is considered destructive testing (i.e., the product is no longer saleable), manufacturers may test only between 0.5% and 1.25% of the production, or about 0.66% of the production. Further, operators, who are already busy with other production-related tasks, are only permitted a limited amount of time to perform each test (e.g., about 1-2 minutes per specimen). Automating the RSF and the CF testing processes, however, can increase the testing speed and the volume of product that can be tested. To automate RSF and CF testing, precautions must be taken to ensure that the specimen are properly loaded to the testing system to ensure accurate measurements.

Figure 1B:
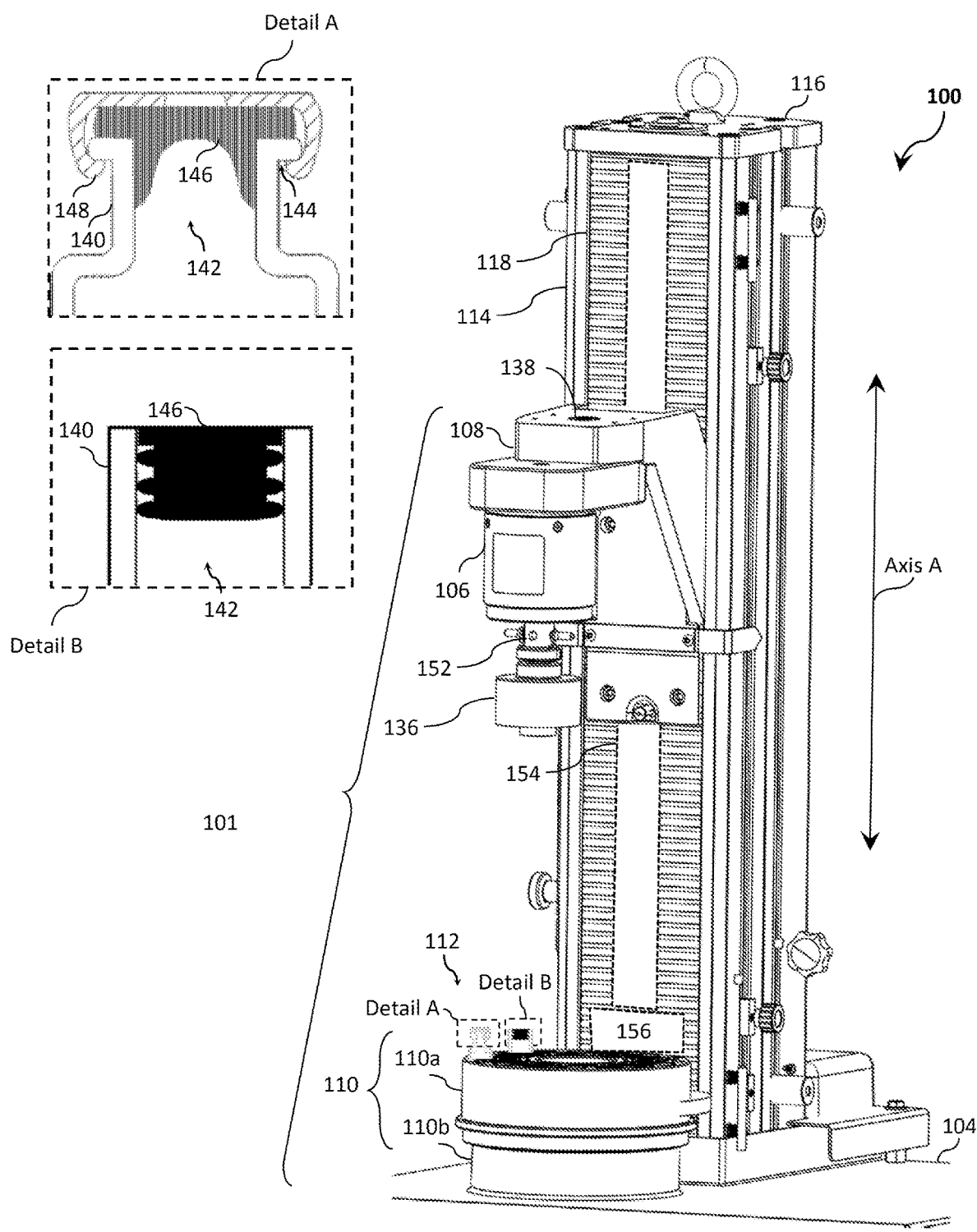
FIG. 1b illustrates a perspective view of the example testing system of FIG. 1a with portions removed to better illustrate the load string.

FIG. 1a illustrates perspective view of an example testing system 100, while FIG. 1b illustrates a perspective view of the load frame 102 of the example testing system 100 with portions omitted for clarity. The testing system 100 generally comprises a load frame 102, a load cell 106 mounted to a crosshead 108 of the load frame 102, a platen assembly 110 at a base structure 104 of the load frame 102, and a controller 150. As will be discussed, the platen assembly 110 is configured to support one or more specimens 112 during compression testing (e.g., RSF or CF testing), whether through a manual or automated process.

As best illustrated in FIG. 1a, the load frame 102 comprises a base structure 104, one or more columns 114, a moving crosshead 108, and a top plate 116. The load frame 102 serves as a high stiffness support structure against which the test forces react (e.g., compressive forces) during a test (e.g., a RSF test, compression friction measurement test, etc.). While the load frame 102 may be composed of a single column 114, as illustrated, multiple columns 114 may be employed, for example, in a dual column arrangement. The base structure 104 generally serves to support the one or more columns 114 and a platen assembly 110 that supports the specimen 112, while also housing various circuitry and components, such as a controller 150.

The platen assembly 110 may be manually or automatically adjusted (or otherwise controlled) to move or transfer a specimen 112 to a testing position, which is typically aligned below the test head 136, test apparatus, or other test accessory. The specimen 112 may be, for example, a container 140 for a parenteral pharmaceutical product as illustrated in FIG. 1b. As best illustrated in Detail A of FIG. 1b, in one example, the container 140 (e.g., a bottle with a flange 144) defines an opening 142 and a flange 144. An elastomeric closure 146 covers the opening 142. A cap 148 is crimped under flange 144 and compresses the elastomeric closure 146 to seal the opening 142. In another example, as best illustrated in Detail B of FIG. 1b, the cap 148 may be omitted whereby the elastomeric closure 146 fits within the opening 142 of the container 140 (e.g., a vial) and presses against the inner surface of the container 140 to seal the opening 142. While the specimen 112 is illustrated as a container 140 with and without a flange 144 and/or cap 148, other types of specimens 112 are also contemplated.

Each of the one or more columns 114 comprises a guide column and a ballscrew 154 that is drivingly coupled to an actuator 156. A ballscrew 154 is a form of mechanical linear actuator that translates rotational motion (e.g., from an actuator 156, such as a motor) to linear motion with little friction. In one example, the ballscrew 154 may include a threaded shaft that provides a helical raceway for ball bearings, which acts as a precision screw. As illustrated in FIG. 1b, the ballscrew 154 is housed within the one or more columns 114 between the base structure 104 and the top plate 116. The actuator 156 that drives the ballscrew 154 is controlled via the controller 150. A column cover 118 may be provided to protect the ballscrew 154 from dirt, grime, and damage, while also protecting the user from harm during operation. The testing system 100 comprises various sensors to monitor its operation. For example, the testing system 100 may include an upper limit switch 132 and a lower limit switch 134 to prevent the crosshead 108 from deviating from an acceptable range of motion along axis A. Upon triggering the upper limit switch 132 or the lower limit switch 134, the controller 150 may stop (or reverse) the actuator 156 to prevent damage to the testing system 100 or the specimen 112.

The crosshead 108 is mounted to both the guide column and the ballscrew 154 and supports the load cell 106. The ballscrew 154 is driven (e.g., rotated) via an actuator 156. Rotation of the ballscrew 154 drives the crosshead 108 up (away) or down (toward) relative to the base structure 104, while the guide column provides stability to the crosshead 108. The load cell 106 may be removably coupled to the crosshead 108 via one or more mechanical fasteners 138 (e.g., screws, bolts, socket head cap screws, etc.) to enable the operator to exchange the load cell 106 when desired. For example, the load cell 106 may become damaged, a different type of load cell 106 may be desired or needed, which can vary by test (e.g., RSF and CF testing).

The display device 126 (e.g., a touch screen display), control panel 128, and/or remote control 130 (e.g., a handset) may be used by the operator to monitor and/or control operation of the testing system 100. In some example, the control panel 128 and the remote control 130 may each provide one or more switches, buttons, or dials to control or adjust operation of the testing system 100 (e.g., an emergency stop button). The control panel 128 and the remote control 130 may further provide one or more status indicators (e.g., LEDs, lights, etc.) to provide a status of the testing system 100. The remote control 130 may be wired or wireless.

To provide additional protection and increase safety, the load string 101 may be housed in an enclosure 120 that defines a test chamber 122. The enclosure 120 may be fabricated from a transparent material (e.g., glass, plastic, Plexiglas, etc.) to enable the operator to observe the load string 101. A door or access panel 124 may be provided to enable access to the test chamber 122 within the enclosure 120. The load string 101 generally refers to the components installed between the moving crosshead 108 and the base structure 104 (or, where applicable, a fixed lower crosshead). Typically, the load string 101 includes the load cell 106, the test head 136, any adapters required to connect the components, and the specimen(s) 112 to be tested. Typically, for RSF testing, the load cell 106 is mounted on the crosshead 108, a test head 136 with an anvil is mounted to the load cell 106, and a specimen 112 is positioned on the base structure 104 (e.g., using a platen assembly 110). Similarly, for CF testing, a load cell 106 is mounted on the crosshead 108, a compression rod is mounted to the load cell 106, and a specimen 112 is positioned on the base structure 104 (e.g., using a platen assembly 110).

Operation of the testing system 100 may be automatically controlled and/or monitored via the controller 150. The controller 150 may comprise a processor 150a and memory device 150b configured with executable instructions. The controller 150 is operably coupled to, and configured to control, the various actuators (e.g., the actuator 156 that drives the ballscrew 154), sensors (e.g., load cell(s) 106, upper and lower limit switches 132, 134), user interfaces (e.g., display device 126, control panel 128, and/or remote control 130), etc.

During the RSF test, for example, the crosshead 108 moves down along Axis A of the load frame 102 (toward the base structure 104) to apply compressive load to the specimen 112 via a test head 136, test apparatus, or other test accessory that is coupled to the load cell 106. The test head 136 may be, or include, an anvil (also known as a dorn) configured to contact and compress the one or more specimens 112. The test head 136, test apparatus, or other test accessory may be coupled directly to a coupler 152 of the load cell 106 or via a compression rod or pin.

The load cell 106 converts this load into an electrical signal that the testing system 100 measures via controller 150 and displays to the operator via display device 126. In one example, the test head 136 may advance at a constant speed (e.g., about 0.01 inches/second). In other words, in this example, for every 0.001 inches the crosshead 108 travels along the column 114 (along Axis A), the controller 150 automatically records the force exerted by the specimen 112 in response to the movement (strain) imposed upon the specimen 112 by the test head 136. The constant speed may be adjusted for a given specimen 112. The controller 150 also automatically records the corresponding strain data. The resulting data set comprises a sequence of stress-strain measurements that can be graphed, which approximates a curve of predictable shape. In the case of RSF, an adequate seal may be determined by monitoring for an inflection point on resulting curve (e.g., indicating the elastomeric closure 146 has transitioned from flexing to rigid, thus sealing the opening 142).

The test head 136 may be designed for RSF and/or CF testing. For example, the test head 136 may be a compression rod for CF testing or include an anvil for RSF testing, such as a test head with an adjustable, conforming anvil. As can be appreciated, certain tests may warrant a specific type of test head 136. For example, the test head 136 used during RSF measurement may include an anvil that is sized and shaped to correspond to the size and shape of the closure of a parenteral container. Therefore, while the test head 136 is generally illustrated in FIGS. 1a and 1b as being configured for RSF testing, a compression rod (and associated load cell) may instead be used for CF testing.

The test head 136 can be interchangeable to enable the testing system 100 to be used for various types of tests (e.g., RSF, CF, tensile, compression, flexure, etc.). In other words, the test head 136 may be configured to removably couple with the load cell 106 via, for example, a coupler 152 or other means to enable the operator to replace or interchange the test head 136 with another the test head 136, test apparatus, or other test accessory. The coupler 152 may employ one or more of a collar coupling (e.g., a collar with one or more set pins or screws), clevis coupling, sleeve coupling, or a screw on coupling (e.g., a threaded rod). Therefore, while the coupler 152 is illustrated as a female collar coupler with set screws and/or set pins, other types of couplings are contemplated.

The one or more specimens 112 are supported on the base structure 104 by the platen assembly 110. Akin to the test head 136, certain tests may warrant a specific type of platen assembly 110. For example, the platen assembly 110 used during RSF measurement may include one or more stations that are sized and shaped to correspond to the size and shape of the parenteral container 140 (or other specimen 112). That that end, the platen assembly 110 may comprise an specimen plate 110a that is test specific or specimen specific, and a base plate 110b supported by the base structure 104 and configured to support the specimen plate 110a. The specimen plate 110a may be removably coupled to the base plate 110b to enable the operator to select a specimen plate 110a that is suitable for a particular test. In one example, the specimen plate 110a is a plate or table that is sized and shaped to support the one or more specimens 112 (e.g., via one or more recesses), while the base plate 110b may be a plate configured to support and/or secure the specimen plate 110a relative to the base structure 104. In some examples, the specimen plate 110a is configured to move relative to the base plate 110b. For example, the specimen plate 110a may be configured to rotate or tilt relative to the base plate 110b to accommodate an approach angle of the test head 136 during compression.

Figure 2A:
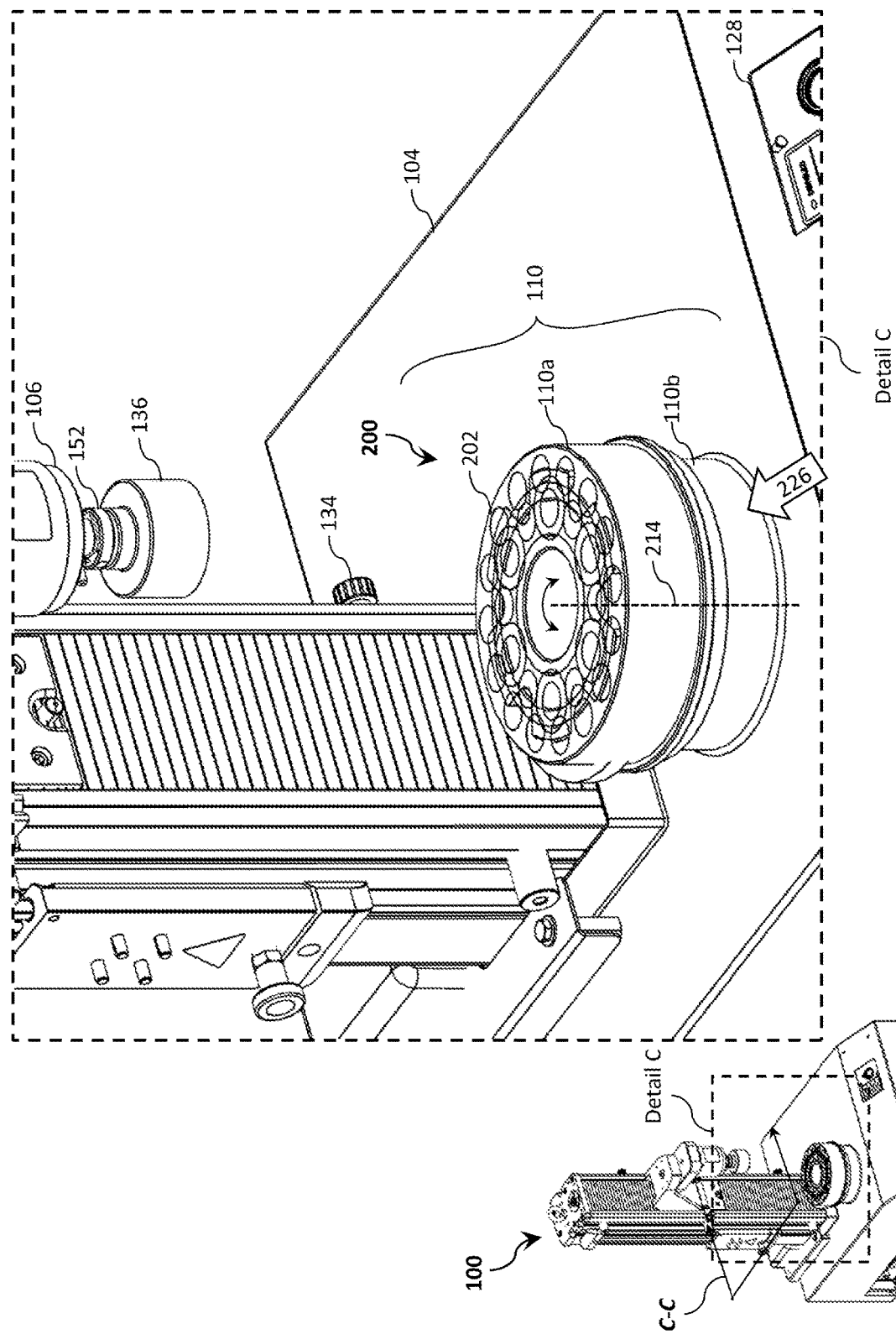
FIG. 2a illustrates an enlarged perspective view of an example rotating platen assembly of a testing system in accordance with aspects of this disclosure.
Figure 2A:
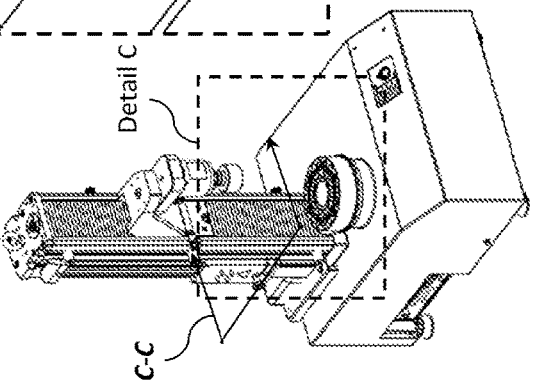
Figure 2B:
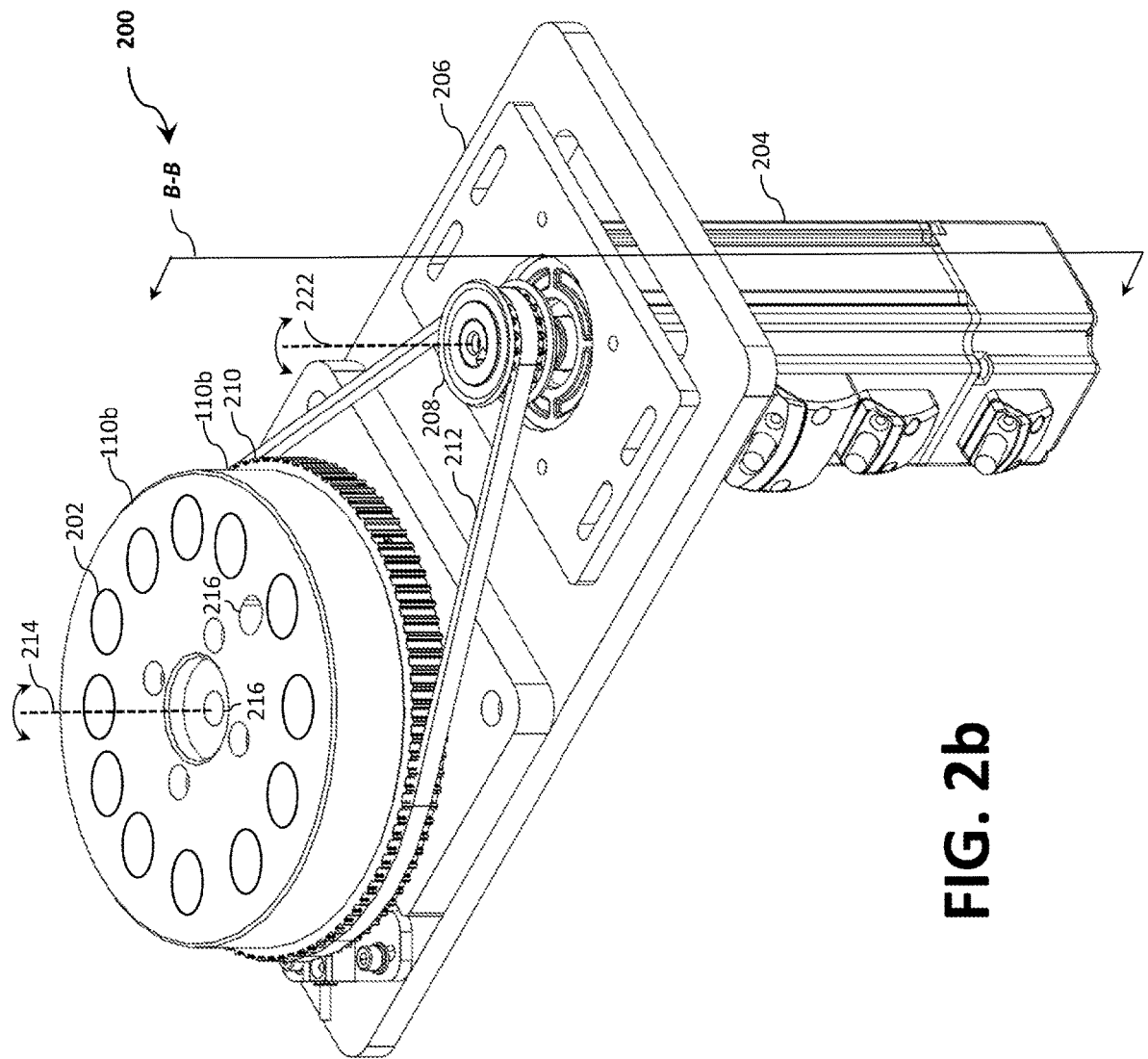
FIG. 2b illustrates a perspective view of the example rotating platen assembly removed from the testing system to better illustrate components of the rotating platen assembly.
Figure 2C:
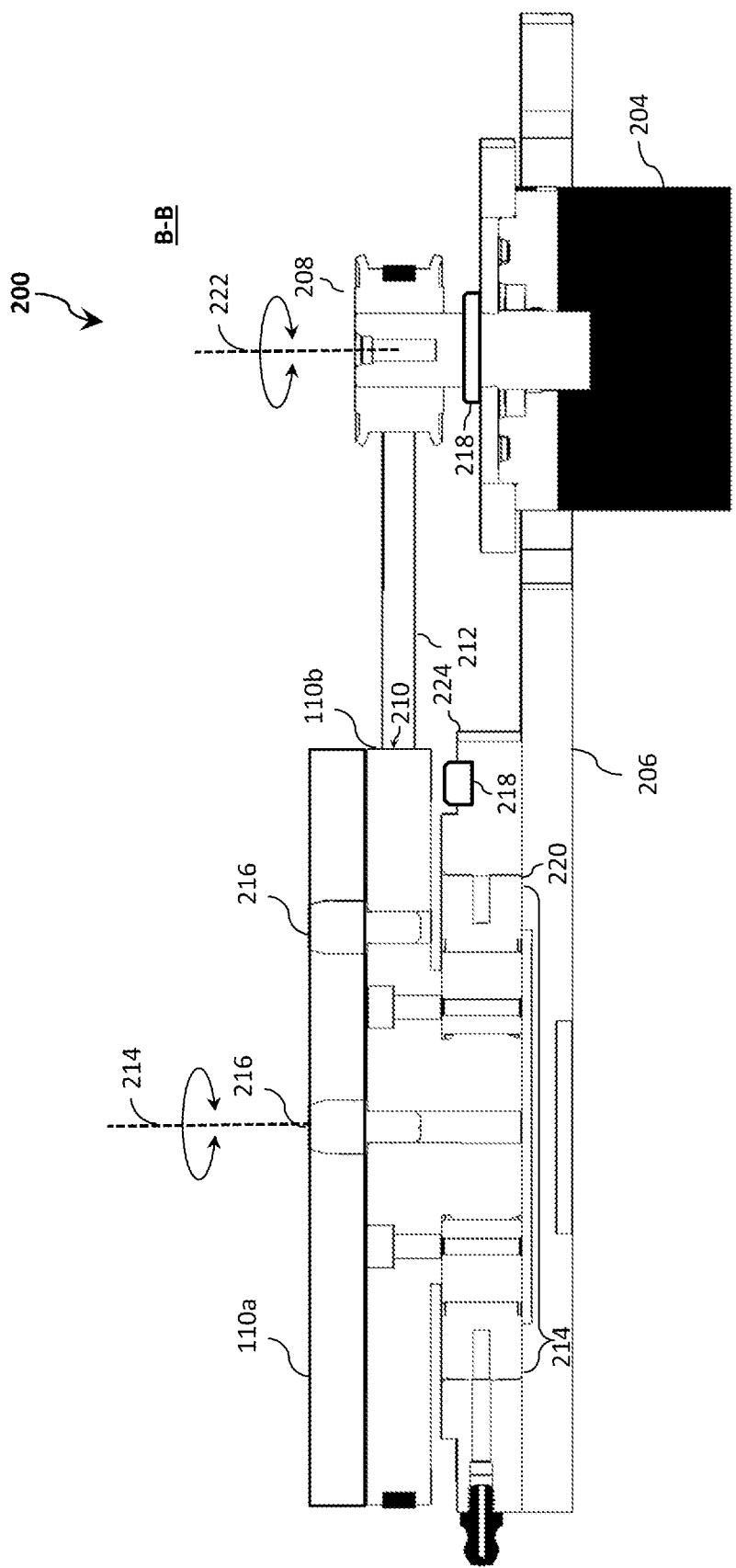
FIG. 2c illustrates a plan cross-sectional view of the second example rotating platen assembly taken along section B-B of FIG. 2b.
Figure 2D:
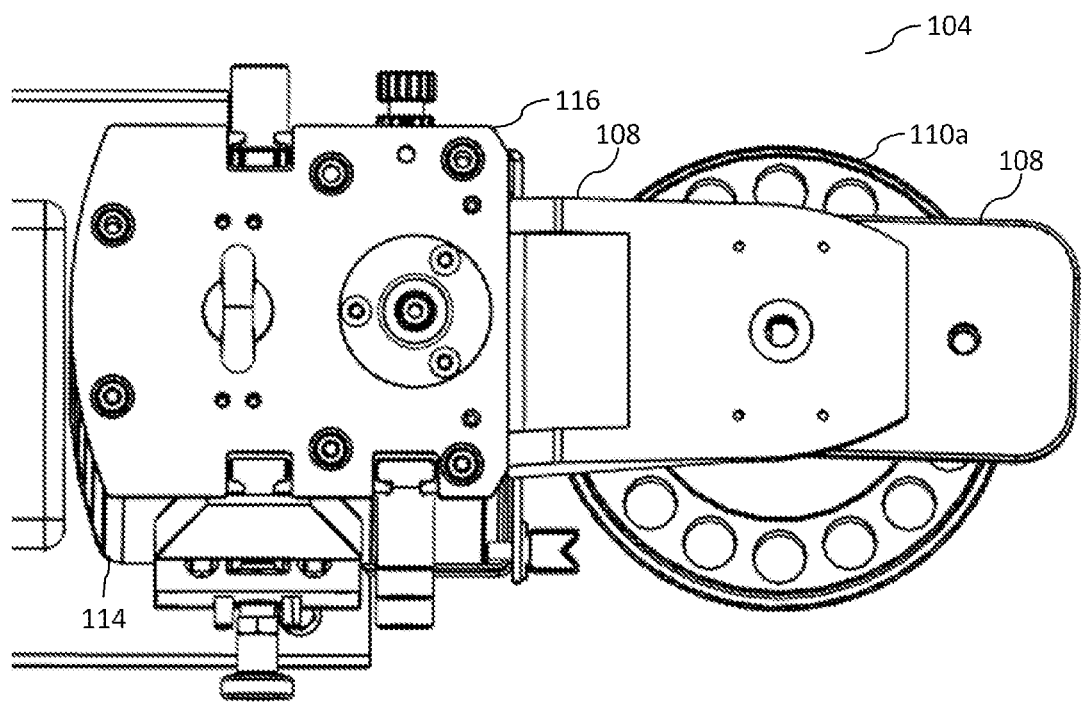
FIG. 2d illustrates a top plan view of the example rotating platen assembly of a testing system.
Figure 2E:
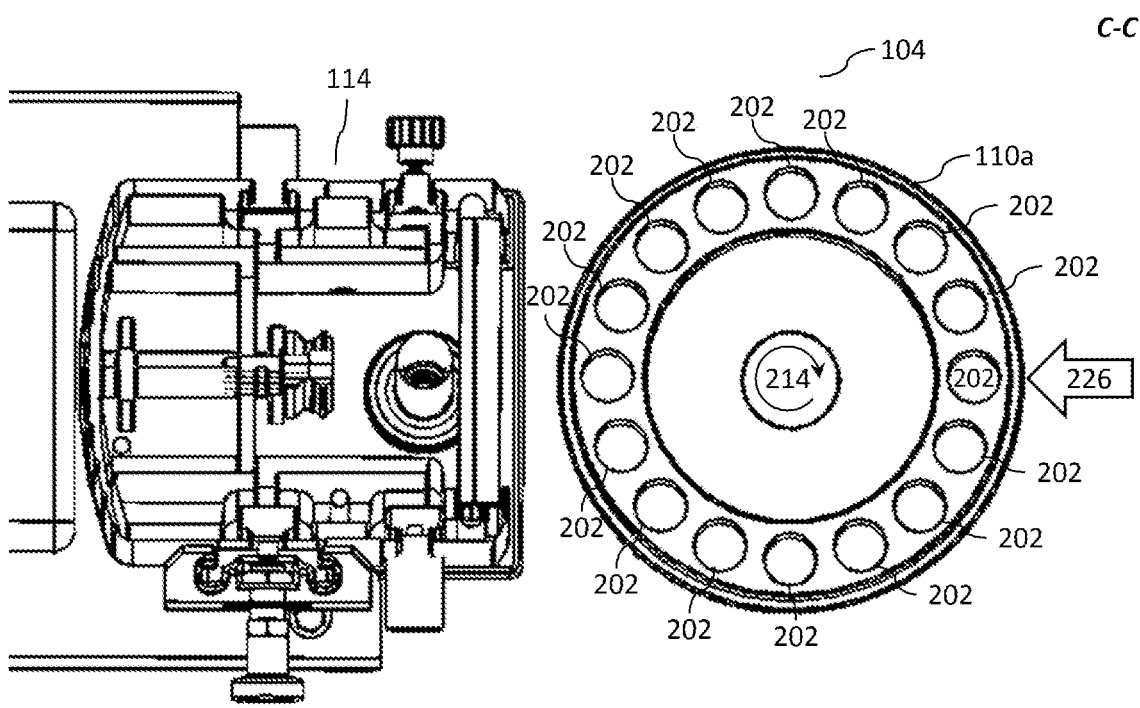

FIG. 2a illustrates an enlarged perspective view of an example rotating platen assembly 200 of a testing system 100 in accordance with aspects of this disclosure, while FIG. 2b illustrates a perspective view of the example rotating platen assembly 200 removed from the testing system 100 to better illustrate components of the rotating platen assembly 200 and FIG. 2c illustrates a plan cross-sectional view of the second example rotating platen assembly 200 taken along section B-B of FIG. 2b. Finally, FIG. 2d illustrates a top plan view of the example rotating platen assembly 200 of a testing system 100, while FIG. 2e illustrates a top plan cross-sectional view of the example rotating platen assembly 200 taken along section C-C of FIG. 2a.

A testing system 100 for performing an automated residual seal force RSF test comprises a column 114 supported by a base structure 104, a load cell 106 supported by said column 114, a specimen plate 110a, and a controller 150. As discussed about with regard to FIGS. 1a and 1b, the load cell 106 is configured to move along the column 114 toward and away from the base structure 104 via a crosshead 108 coupled to an actuator 156.

The specimen plate 110a is configured to receive a plurality of specimens 112 (e.g., at least a first specimen 112 and a second specimen 112). To facilitate automated testing, the controller 150 is configured to adjust a position of the specimen plate 110a via one or more actuators (e.g., an electric motor 204) to position a desired specimen 112 at the testing position 226 for testing. For example, as best illustrated with reference FIGS. 2d and 2e, the testing system 100 includes a testing position 226 that is aligned below the test head 136, test apparatus, or other test accessory. In other words, while the specimen plate 110a is illustrated with a plurality of stations 202 (e.g., twelve), only the station 202 (and associated specimen 112) positioned at the testing position 226 will be contacted/compressed by the test head 136 during the RSF test.

In operation, the controller 150 is configured to position the specimen plate 110a in a first position that situates the first specimen 112 at a testing position 226 of the testing system 100. The controller 150 then advances, via the first actuator 156, the crosshead 108 along the column 114 toward the base structure 104 to compress the first specimen 112. During compression, the controller 150 determines, via a processor 150a operatively coupled to the load cell 106, a residual seal force of the first specimen 112. Once the RSF test is completed for the first specimen 112, the controller 150 retracts, via the first actuator 156, the crosshead 108 along the column 114 away the base structure 104. The controller 150 then positions, via the second actuator 204, the specimen plate 110a in a second position that situates the second specimen 112 at the testing position 226.

The controller 150 then advances, via the first actuator 156, the crosshead 108 along the column 114 toward the base structure 104 to compress the second specimen 112. During compression, the controller 150 determines, via the processor 150a, a residual seal force of the second specimen 112. Once the RSF test is complete for the second specimen 112, the controller 150 retracts, via the first actuator 156, the crosshead 108 along the column 114 away the base structure 104. This process may be repeated for each specimen 112 loaded to the specimen plate 110a. While 12 stations 202 (and therefore up to 12 specimen 112) are illustrated, the specimen plate 110a may be scaled up or down depending on the volume of specimen 112 for testing.

With reference to FIG. 2c, in one example, the rotating platen assembly 200 includes an electric motor 204, a specimen plate 110a, and a base plate 110b. The electric motor 204 is configured to output a rotational force via a driving pulley 208 about axis of rotation 222. In some examples, the electric motor 204 is a stepper motor. The base plate 110b is configured to support the specimen plate 110a. The specimen plate 110a comprises a plurality of stations 202 (e.g., 2 to 24 stations 202, or about 12), each of said plurality of stations 202 being configured to receive a specimen 112. The specimen plate 110a may be fabricated from plastic, composite materials, metals and/or metal alloys. In some examples, each of the plurality of stations 202 is molded or bored into the specimen plate 110a. In some examples, the specimen plate 110a is removably coupled to the base plate 110b. The specimen plate 110a may be removably coupled to the base plate 110b via one or more dowels 216, which can prevent the specimen plate 110a from rotating relative to the base plate 110b. In some example, the specimen plate 110a and the base plate 110b may be fabricated as a unitary structure or as separate structures that are coupled together (e.g., fixedly or removably coupled).

The base plate 110b comprises a driven pulley 210 that is drivingly coupled to the driving pulley 208. In some examples, the driven pulley 210 is drivingly coupled to the driving pulley 208 via a belt 212. In operation, the electric motor 204 is configured to rotate the base plate 110b about an axis of rotation 214. The base plate 110b and the driven pulley 210 may be fabricated as a unitary structure or as separate structures that are coupled together. In some examples, the electric motor 204, the driven pulley 210, and the driving pulley 208 are fixed in location relative to one another by a mounting plate 206. The driven pulley 210 may be attached to the mounting plate 206 via one or more ball bearings 214. To increase the strength of the rotating platen assembly 200 during compression, the one or more ball bearings 214 may be positioned within a recess 220 formed on or within the mounting plate 206. In some examples, each of driving pulley 208 and the driven pulley 210 is a timing pulley, while the belt 212 is a toothed belt.

The rotating platen assembly 200 may further comprise a position sensor 218 configured to determine a rotational position of the base plate 110b about the axis of rotation 214. In one example, the position sensor 218 uses a combination of a motor encoder to determine a position of the motor and an optical sensor to determine the home position. In other examples, the position sensor 218 may use, for example, a Hall-effect sensor, a resolver, or a rotary potentiometer. For example, the 150 may be operatively coupled to the position sensor 218 and configure to monitor the position of the in real-time or near real-time.

Figure 3:
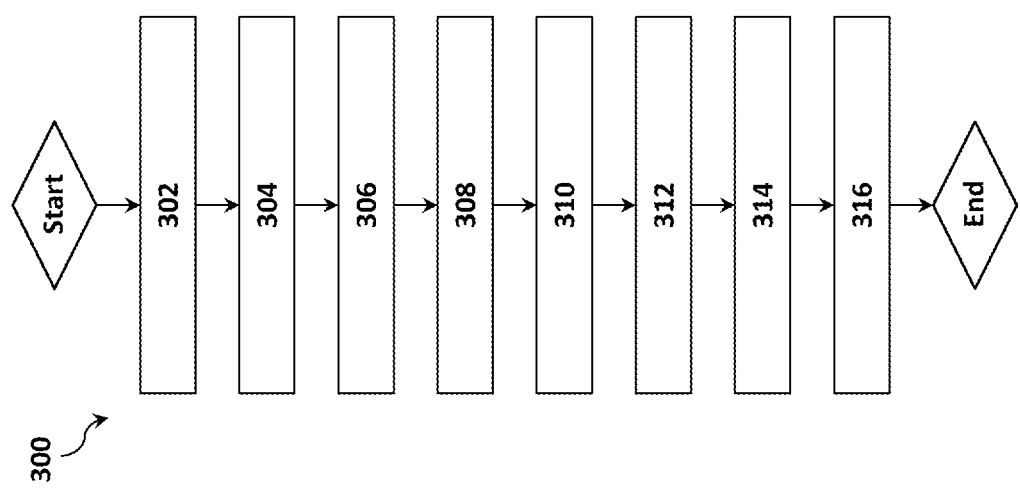
FIG. 3 is a flowchart representative of an example method for operating the example testing system.

FIG. 3 is a flowchart representative of an example method 300 for performing an automated residual seal force RSF test in a testing system 100. While a RSF test is described, compression friction measurements can similarly be taken via testing system 100. The testing system 100 comprises a load cell 106 configured to move along a column 114 toward and away from a base structure 104 via a crosshead 108.

At step 302, a plurality of specimens 112 are loaded to a specimen plate 110a. The plurality of specimens 112 are loaded to a specimen plate 110a may be loaded through a manual or automated process. The plurality of specimens 112 comprises a first specimen 112 and a subsequent specimen 112 (e.g., a second specimen 112).

At step 304, the specimen plate 110a is positioned in a first position that situates the first specimen 112 at a testing position 226 of the testing system 100. The specimen plate 110a can be positioned in a first position manually (e.g., by the operator before the test is commenced) or via an electric motor 204.

At step 306, the actuator 156 advances the crosshead 108 along the column 114 toward the base structure 104 to compress the first specimen 112.

At step 308, the processor 150a, which is operatively coupled to the load cell 106, determines a residual seal force of the first specimen 112.

At step 310, the actuator 156 retracts the crosshead 108 along the column 114 away the base structure 104.

At step 312, the electric motor 204 positions the specimen plate 110a in a second position that situates the subsequent specimen 112 at the testing position 226.

At step 314, the actuator 156 advances the crosshead 108 along the column 114 toward the base structure 104 to compress the subsequent specimen 112.

At step 316, the processor 150a determines a residual seal force of the subsequent specimen 112. Steps 312 through 316 may be automatically repeated for each subsequent specimen 112 until each of the plurality of specimens 112 loaded to the specimen plate 110a is tested.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A testing system for performing an automated specimen test, the testing system comprising:
   a column supported by a base structure;
   a load cell supported by said column, wherein the load cell is configured to move along the column toward and away from the base structure via a crosshead coupled to a first actuator;
   a specimen plate configured to receive a plurality of specimens, said plurality of specimens comprising a first specimen and a second specimen;
   a second actuator configure to adjust a position of said specimen plate;
   a rotating platen assembly comprising a base plate configured to support the specimen plate, wherein:
      the specimen plate is removably coupled to the base plate via one or more dowels;
      the second actuator comprises an electric motor configured to drive the rotating platen assembly via a driving pulley;
      the base plate comprises a driven pulley that is drivingly coupled to the driving pully; and
      the electric motor is configured to rotate the base plate about an axis of rotation; and
   a controller operatively coupled to each of the load cell, the first actuator, and the second actuator, wherein the controller is configured to:
      position the specimen plate in a first position that situates the first specimen at a testing position of the testing system;
      advance, via the first actuator, the crosshead along the column toward the base structure to compress the first specimen;
      determine, via a processor operatively coupled to the load cell, a residual seal force or a compression friction of the first specimen;
      retract, via the first actuator, the crosshead along the column away the base structure;
      position, via the second actuator, the specimen plate in a second position that situates the second specimen at the testing position;
      advance, via the first actuator, the crosshead along the column toward the base structure to compress the second specimen; and
      determine, via the processor operatively coupled to the load cell, a residual seal force or a compression friction of the second specimen.

2. The testing system of claim 1, wherein the first actuator is configured to drive a ballscrew.

3. The testing system of claim 1, wherein the second actuator is a stepper motor.

4. A testing system for performing an automated specimen test, the testing system comprising:
   a column supported by a base structure;
   a load cell supported by said column, wherein the load cell is configured to move along the column toward and away from the base structure via a crosshead coupled to an actuator;
   a base plate supported by the base structure and configured to support a specimen plate, wherein:

the specimen plate comprises a plurality of stations, each of said plurality of stations being configured to receive a specimen, and the specimen plate is removably coupled to the base plate via one or more dowels;

an electric motor configured to output a rotational force to a driving pulley that is drivingly coupled to a driven pulley, wherein the driven pulley is configured to rotate the base plate about an axis of rotation; and a controller operatively coupled to each of the load cell, the actuator, and the electric motor, wherein the controller is configured to:

rotate, via the electric motor, the base plate to a first rotational position that situates a first specimen at a testing position;

advance, via the actuator, the crosshead along the column toward the base structure to compress the first specimen;

determine, via a processor operatively coupled to the load cell, a residual seal force or a compression friction of the first specimen;

retract, via the actuator, the crosshead along the column away the base structure;

rotate, via the electric motor, the base plate to a second rotational position that situates a second specimen at the testing position; and determine, via the processor operatively coupled to the load cell, a residual seal force or a compression friction of the second specimen.

5. The testing system of claim 4, wherein the electric motor, the driven pulley, and the driving pulley are fixed in location relative to one another by a mounting plate.

6. The testing system of claim 5, wherein the driven pulley is attached to the mounting plate via one or more ball bearings.

7. The testing system of claim 6, wherein the one or more ball bearings are positioned within a recess formed on or within the mounting plate.

8. The testing system of claim 4, further comprising a position sensor configured to determine a rotational position of the base plate or the specimen plate about the axis of rotation.

9. The testing system of claim 8, wherein the position sensor comprises at least one of a motor encoder, a Hall-effect sensor, a resolver, or a rotary potentiometer.

10. The testing system of claim 4, wherein the electric motor is a stepper motor.

11. The testing system of claim 4, wherein the driven pulley is drivingly coupled to the driving pulley via a belt.

12. The testing system of claim 11, wherein each of driving pulley and the driven pulley is a timing pulley.

13. The testing system of claim 11, wherein the belt is a toothed belt.

14. The testing system of claim 8, wherein the controller is further configured to rotate the base plate to a desired rotational position based on a sensor reading from the position sensor.

15. The testing system of claim 14, wherein the desired rotational position is a home position.

16. The testing system of claim 14, wherein the controller is configured to rotate the base plate, via the electric motor, through each of the plurality of stations as part of an automated residual seal force (RSF) or compression friction (CF) test.

17. The testing system of claim 16, wherein the controller is configured to rotate the base plate through each of the plurality of stations sequentially.

18. A testing system for performing an automated specimen test, the testing system comprising:

a column supported by a base structure;

a load cell supported by said column, wherein the load cell is configured to move along the column toward and away from the base structure via a crosshead coupled to an actuator;

a base plate supported by the base structure and configured to support a specimen plate, wherein the specimen plate comprises a plurality of stations, each of said plurality of stations being configured to receive a specimen;

an electric motor configured to output a rotational force to a driving pulley that is drivingly coupled to a driven pulley, wherein the driven pulley is configured to rotate the base plate about an axis of rotation, wherein:

the electric motor, the driven pulley, and the driving pulley are fixed in location relative to one another by a mounting plate;

the driven pulley is attached to the mounting plate via one or more ball bearings; and the base structure comprises a welded ring adjacent or around the one or more ball bearings to mitigate liquid penetration into the base structure; and a controller operatively coupled to each of the load cell, the actuator, and the electric motor, wherein the controller is configured to:

rotate, via the electric motor, the base plate to a first rotational position that situates a first specimen at a testing position;

advance, via the actuator, the crosshead along the column toward the base structure to compress the first specimen;

determine, via a processor operatively coupled to the load cell, a residual seal force or a compression friction of the first specimen;

retract, via the actuator, the crosshead along the column away the base structure;

rotate, via the electric motor, the base plate to a second rotational position that situates a second specimen at the testing position; and determine, via the processor operatively coupled to the load cell, a residual seal force or a compression friction of the second specimen.

19. The testing system of claim 18, further comprising a position sensor configured to determine a rotational position of the base plate or the specimen plate about the axis of rotation.

20. The testing system of claim 18, wherein the driven pulley is drivingly coupled to the driving pulley via a belt.

* * * * *